United States Patent [19]

Wang et al.

[11] 4,132,318
[45] Jan. 2, 1979

[54] ASYMMETRIC SIX-DEGREE-OF-FREEDOM FORCE-TRANSDUCER SYSTEM FOR A COMPUTER-CONTROLLED MANIPULATOR SYSTEM

[75] Inventors: Sherman S. Wang, Mohegan Lake; Michael A. Wesley, Somers, both of N.Y.; Peter M. Will, Norwalk, Conn.

[73] Assignee: International Business Machines Corporation, Armonk, N.Y.

[21] Appl. No.: 755,900

[22] Filed: Dec. 30, 1976

[51] Int. Cl.² .............................................. G01L 5/16
[52] U.S. Cl. ..................................... 214/1 BB; 73/65; 73/133 R; 214/1 BC; 214/1 BD; 214/1 CM; 214/2; 294/86 R
[58] Field of Search ..................... 214/1 R, 1 B, 1 BB, 214/1 BC, 1 BD, 147 T, 147 G, 2, 1 CM; 235/92 WT; 3/12.6, 12.7, 12.8; 73/65, 89, 100, 133 R; 294/88–119

[56] References Cited

U.S. PATENT DOCUMENTS

| | | | |
|---|---|---|---|
| 3,418,662 | 12/1968 | Bottomley et al. | 3/12.7 X |
| 3,575,301 | 4/1971 | Panissidi | 214/147 T X |
| 3,948,093 | 4/1976 | Folchi et al. | 73/133 R |
| 3,952,880 | 4/1976 | Hill et al. | 214/1 CM |
| 4,017,721 | 4/1977 | Michaud | 214/1 CMX |

FOREIGN PATENT DOCUMENTS 361868  1/1973  U.S.S.R. .............................. 214/1 CM

Primary Examiner—Frank E. Werner
Attorney, Agent, or Firm—Graham S. Jones II

[57] ABSTRACT

A computer-controlled-manipulator gripper with a set of three-degree-of-freedom force sensors on each finger having strain gauges and 90° shift in orientation of the sensors includes an asymmetric, offset relationship of the location and orientation of analogous sensors on the two fingers in order to obtain different measurements from the two fingers.

13 Claims, 14 Drawing Figures

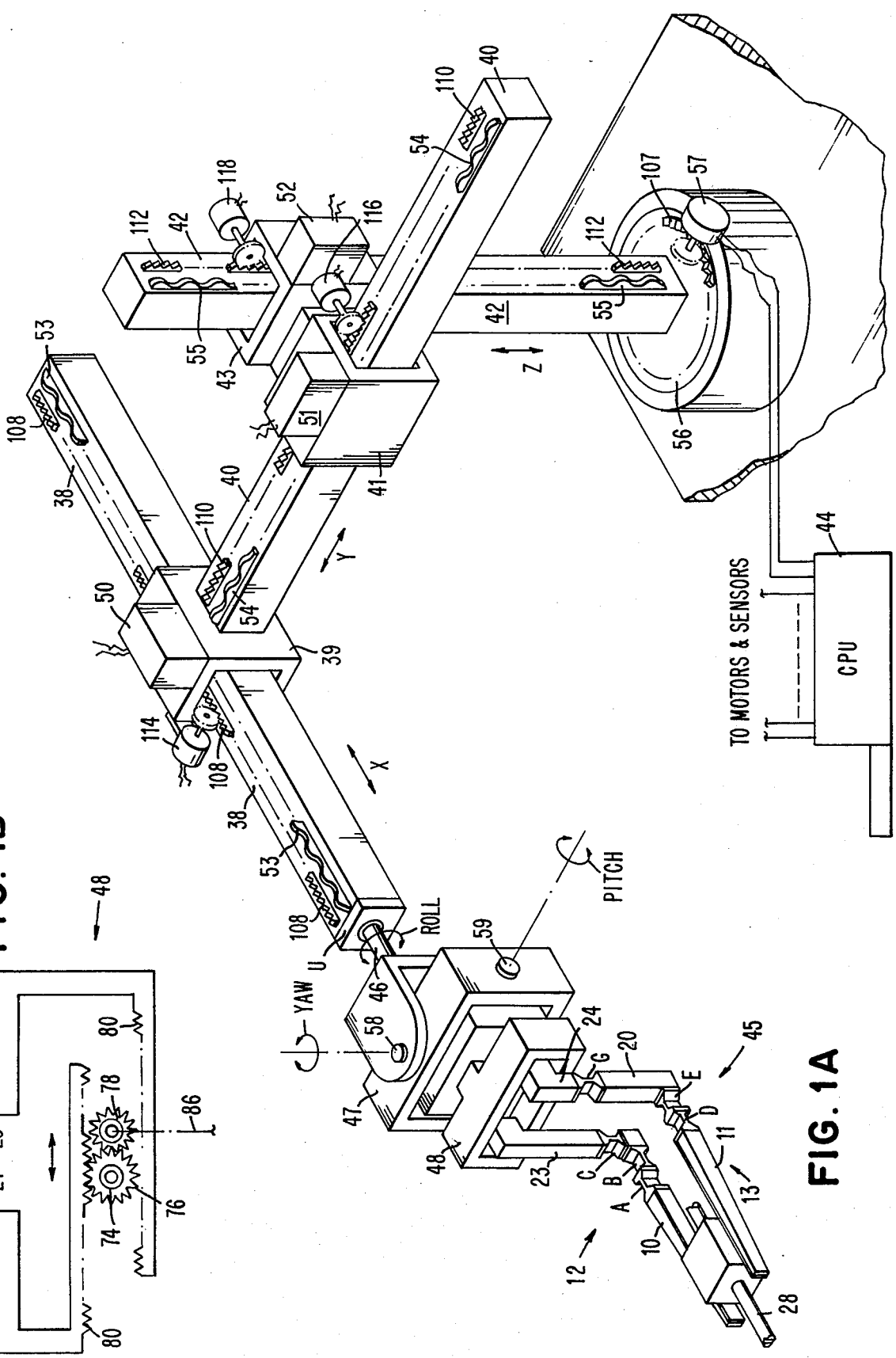
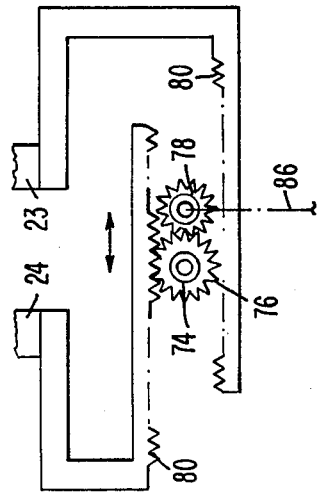
FIG. 1B
FIG. 1A

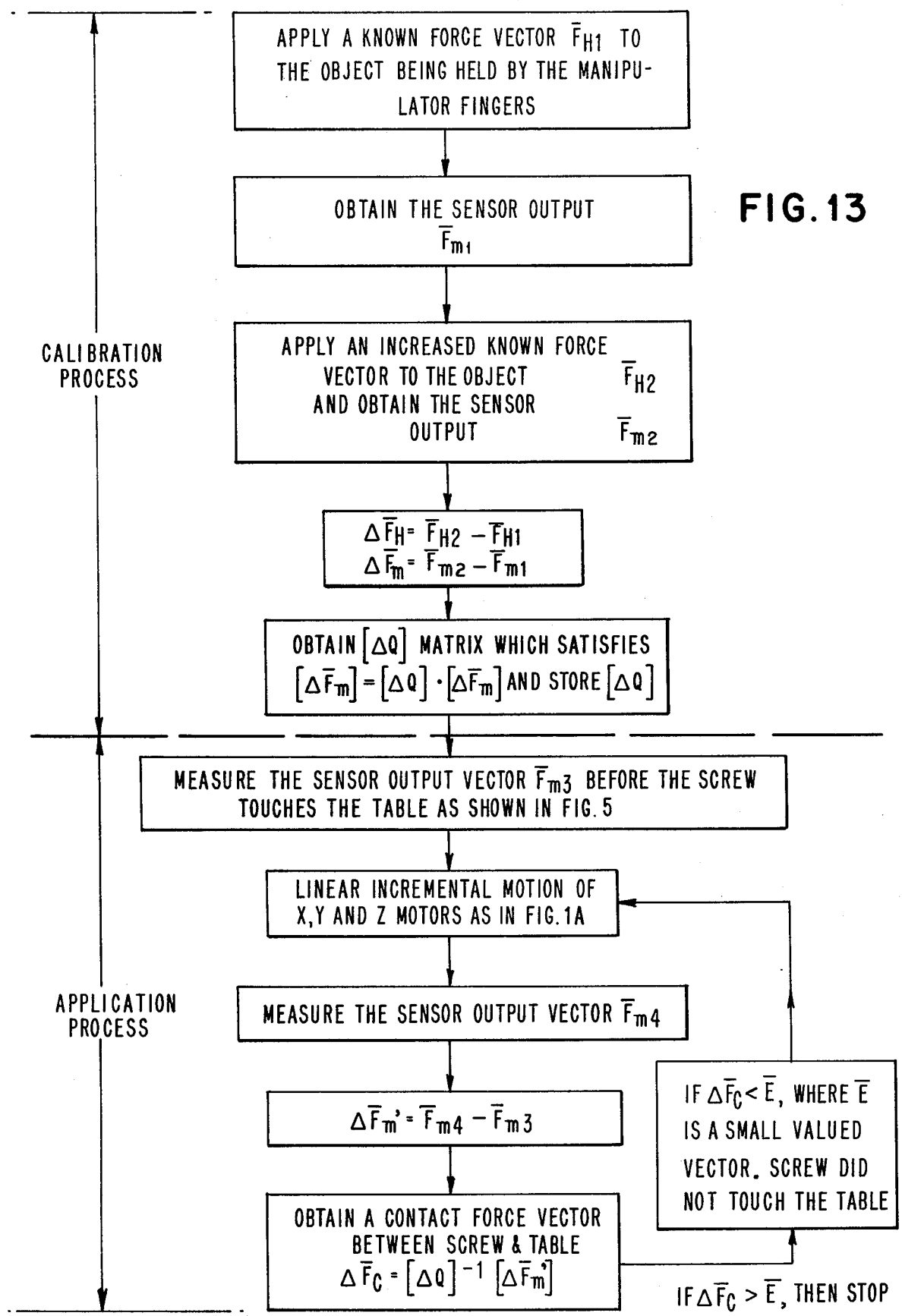

ASYMMETRIC SIX-DEGREE-OF-FREEDOM FORCE-TRANSDUCER SYSTEM FOR A COMPUTER-CONTROLLED MANIPULATOR SYSTEM

BACKGROUND OF THE INVENTION

This invention relates to measuring and testing for a computer-controlled manipulator, and more particularly to force transducer measuring devices comprising dynamometers applied to a manipulator system.

DESCRIPTION OF THE PRIOR ART

The manipulator gripper of U.S. Pat. No. 3,948,093 of Folchi et al. for a Six-Degree-of-Freedom Force Transducer for a Manipulator System employs pairs of strain gauges mounted on I-beam modules to measure forces on the fingers. It employs a modular approach with x-y-z orthogonality. Stiffness is of the same order in all directions. There is minimum cross-sensitivity, minimum backlash, and there are overload stops.

SUMMARY OF THE INVENTION

An object of this invention is to measure the gripping force and a force vector applied to the object being held by a manipulator finger.

Another object of this invention is to employ an offset distant configuration to make it possible for two sets of three-degree-of-freedom force sensors to measure a six-degree-of-freedom force vector applied to the object being held by the finger.

Still another object of this invention is to permit a pair of manipulator fingers to pick up a long rod without interfering with the manipulator gimbal system by use of an offset sensor.

In accordance with this invention, a manipulator gripper includes two fingers, each of the fingers includes a plurality of sensors for measuring forces. The sensors are located on the inboard end of the fingers for measuring forces applied to the fingers. A sensor on one of the fingers has a substantial positional offset with respect to the location of the corresponding sensor on the other one of the fingers. Other aspects of this invention are found below.

BRIEF DESCRIPTION OF THE DRAWINGS

FIG. 1A shows a perspective view of a computer-controlled manipulator employing the force-sensor apparatus in accordance with this invention.

FIG. 1B shows a finger drive mechanism for the fingers of FIG. 1A.

FIG. 13 shows a flow chart for determining the contact force between an object and a work table.

DESCRIPTION OF THE PREFERRED EMBODIMENT

Figure 2:
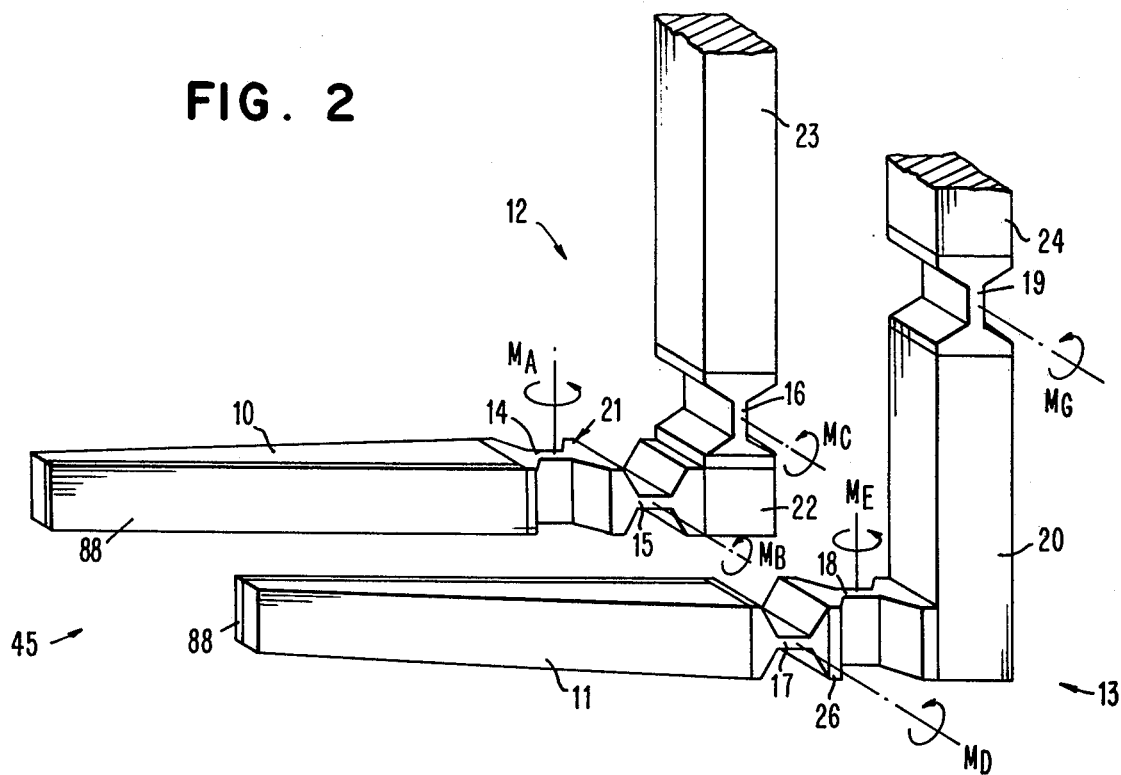
FIG. 2 shows a perspective view of the gripper fingers including the force-sensor apparatus shown in FIG. 1A.

FIG. 1A shows a manipulator controlled by a central processing unit (CPU) 44 having three mutually perpendicular X, Y and Z arm segments 38, 40 and 42 for providing x, y and z directions of motion of the gripper. Segments 38, 40, and 42 are slidably connected together by holders 39, 41 and 43 to provide an articulated three-part manipulator arm, as shown in U.S. Pat. No. 4,001,556 of Folchi et al. filed Apr. 7, 1975. It is somewhat similar to the manipulator structure shown in U.S. Pat. No. 3,575,301 of Panissidi for a "Manipulator". At the outboard end of the arm segment 38 is shown a gripper 45 connected to X arm segment 38 by roll shaft 46 wrist 47, and finger drive mechanism 48. The X arm segment 38 is slidable in holder 39 affixed to the end of Y arm segment 40. Holder 39 carries a linear motor 50 affixed thereto including actuators adapted for operating upon a parabolic displacement cam 53 in accordance with U.S. Pat. No. 3,848,515 of Gardineer et al. for a "Linear Hydraulic Drive System". Rack 108 drives a potentiometer 114 by its associated pinion. Potentiometer 114 operates to send messages indicating X arm position data to CPU 44 indicating the position of arm 38. Y arm segment 40 is slidable along the Y axis in holder 41 with a similar drive motor 51 secured thereto to operate upon cam 54. Potentiometer 116 is driven by its pinion riding on rack teeth 110, as segment 40 moves by to signal Y arm position data to CPU 44. Z arm segment 42 does not move up and down along the z axis, but instead, holder 43 is rigidly and permanently secured to holder 41 and holder 43 has motor 53 secured thereto to operate upom cam 55 to raise and lower the rest of the arm including segments 38 and 40, etc. on arm segment 42. Z axis position is sensed by potentiometer 118 and rack teeth 112. The entire structure is rotatable about the center of arm segment 42 which is mounted upon a rotatable disc which is driven by a rotary drive inside cylinder 56. Potentiometer 57 driven by rack teeth 107 senses arm rotation. Still another rotary drive turns roll shaft 46, as do motors for the yaw, and pitch axes 58 and 59 of wrist 47. The finger drive mechanism 48 moves fingers 10 and 11 of gripper 45 which can be opened or closed (moved together and apart) by means of the mechanism shown in FIG. 1B.

As shown in FIG. 1B, the motor 74 is operatively connected by means of gears 76 to a pair of gear racks 80 for driving the finger driver blocks 23 and 24 either toward or away from each other in unison. Gear racks 80 move longitudinally to the left and right as shown by the arrows in FIG. 1B. A potentiometer 78 has its shaft teeth in operative engagement with motor gears 76 so that the motor shaft angular position is reflected in the output of the potentiometer 78 on line 86. This output on line 86 is therefore directly related to the separation of the finger driver blocks 23 and 24.

Referring to FIG. 2, the gripper 45 consists of two fingers 10 and 11. A three-degree-of-freedom force sensor 12 is connected to the inboard end of the right finger 10. Another three-degree-of-freedom force sensor 13 with a different offset distance, is connected to the inboard end of the left finger 11. In other words, the sensor system for the two fingers is not symmetrical.

The sensor 12 is composed of three I-beam sensor modules 14, 15, 16 and sensor 13 is composed of similar modules 17, 18, 19, having a pair of strain gauges on each leg as described in U.S. Pat. No. 3,948,093 described above.

Right Finger

Figure 3:
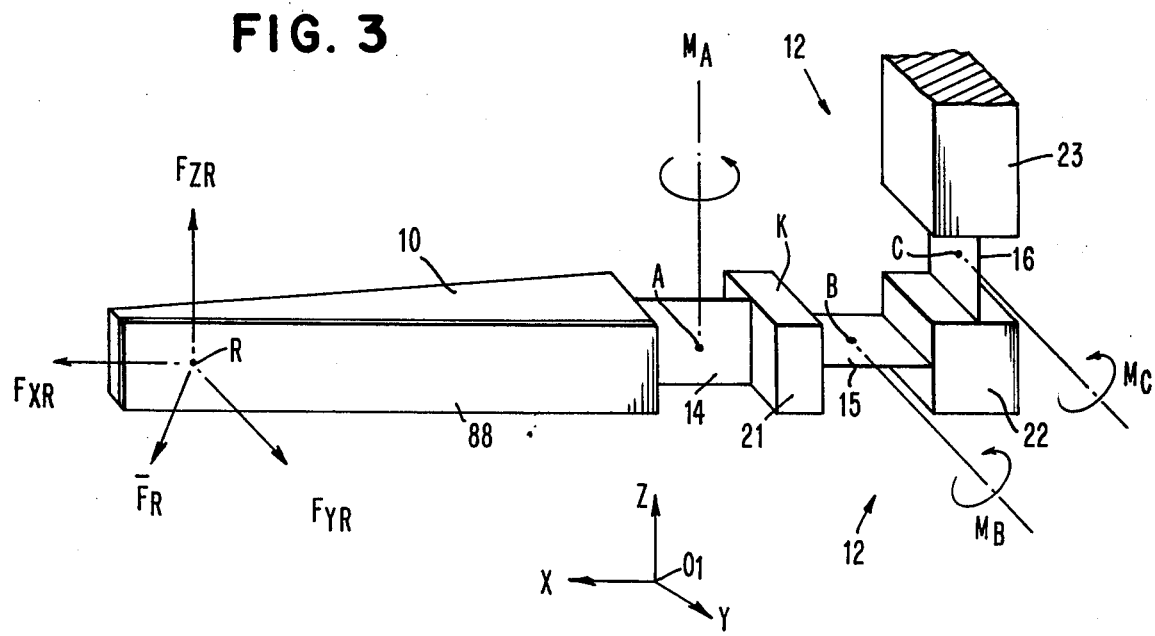
FIG. 3 shows the right finger of FIG. 2 with force R applied thereto.

In FIG. 3, the right finger 10 is connected at its inner end to sensor module 14, A, having a vertical blade as shown with a rectangular surface extending up and down. Module 14, A, is connected to block 21, which connects to sensor module 15, B, which has a horizontal blade with its rectangular surface extending from side to side. Module 15, B, is connected to elbow-block 22 which is connected to module 16, C, which has a vertical blade extending normal to the planes of the blades of modules 14 and 15 with its rectangular surface extending from side to side. Module 16, C, is connected to driver block 23 attached to finger drive mechanism 48. If the right finger is not holding an object, a force vector $\bar{F}_R$ applied at an arbitrary point R on the right finger 10 can be approximately resolved into three component vectors, $F_{XR}$, $F_{YR}$ and $F_{ZR}$ is shown in FIG. 3. The force sensor 12 has been designed such that each module of the three modules A, B and C comprising sensor 12 will be sensitive only to the moment in one specific direction. For example, at point A in FIG. 3, sensor 14 measures only the moment in the direction of the moment $M_A$. The output of force sensor 14 output at point A can be related to the external force vector $\bar{F}_R$ by $$M_A = -F_{XR} \cdot (Y_R - Y_A) + F_{YR} \times (X_R - X_A) \qquad (1)$$

where $Y_R$ and $Y_A$ are the Y coordinates of points R and A and $X_R$ and $X_A$ are the X coordinates of those points. In a similar manner, the sensor output at points B and C for sensors 15 and 16, respectively provide $$M_B = F_{XR} \cdot (Z_R - Z_B) - F_{ZR} \cdot (X_R - X_B) \qquad (2)$$

$$M_C = F_{XR} \cdot (Z_R - Z_C) - F_{ZR} \cdot (X_R - X_C) \qquad (3)$$

Equations (1), (2) and (3) can be written in a matrix form $$\begin{bmatrix} M_A \\ M_B \\ M_C \end{bmatrix} = \begin{bmatrix} -(Y_R - Y_A) & (X_R - Y_A) & 0 \\ (Z_R - Z_B) & 0 & -(X_R - X_B) \\ (Z_R - Z_C) & 0 & -(X_R - X_C) \end{bmatrix} \cdot \begin{bmatrix} F_{XR} \\ F_{YR} \\ F_{ZR} \end{bmatrix} \qquad (4)$$

Left Finger

Figure 4:
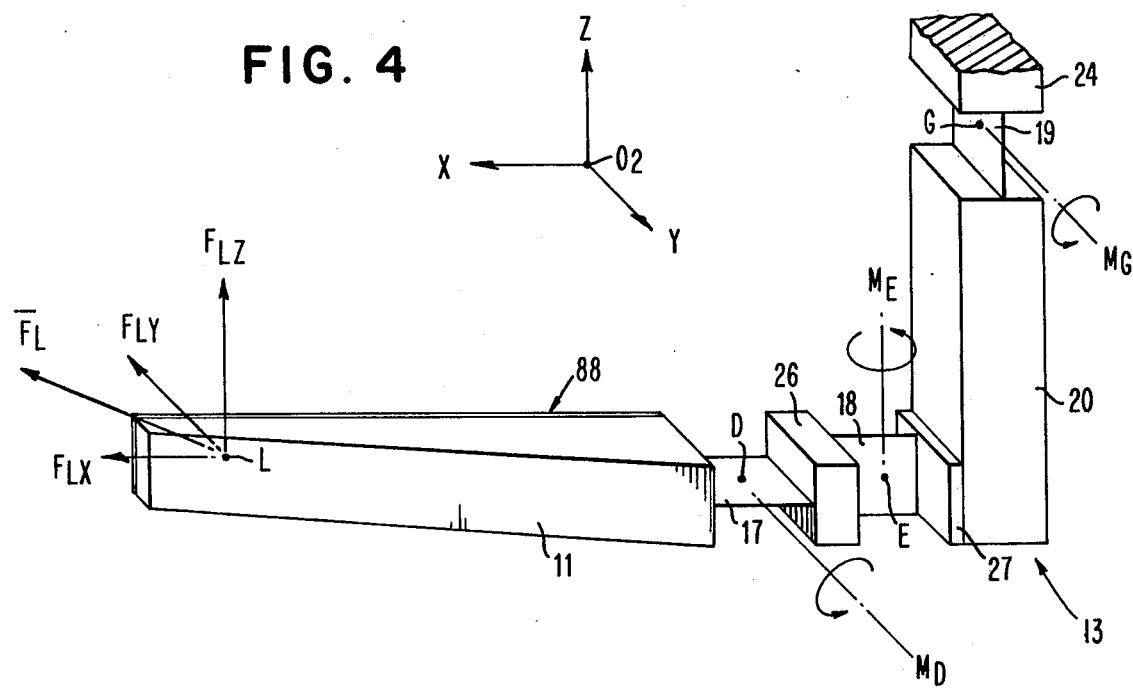
FIG. 4 shows the left finger of FIG. 2 with force L applied thereto.

As shown in FIG. 4, the left finger 11 is connected at its inner end to sensor module 17, D, having a horizontal blade extending laterally. Module 17, D is connected to block 26 which is connected to module 18, E, having a vertical blade extending up and down along the axis of finger 11. An elbow has a horizontal leg 27 and a vertical leg 20 which is far longer than the vertical extent of elbow block 22 of the right finger 10. Module 19, G, connects leg 20 to driver block 24 attached to the other end of the finger drive mechanism 48. Module 19, G, has a vertical blade extending up and down across the linkage 24 normal to the axis of finger 11 in a plane parallel to that of module 16 and normal to those of modules 17, D, and 18, E. Thus module 19, G, has a substantial offset from module 16, C.

For the left finger 11, a three-degree-of-freedom force sensor is also mounted on the inner end of the finger. However, the sensor location is different from the corresponding sensor location for the right finger. An intentional offset distance has been provided by leg 20 extending above elbow 21 about one or two inches. Again, a force vector, $F_L$, applied at point L on the left finger can be approximately resolved into three components. $F_{LX}$, $F_{LY}$ and $F_{LZ}$ as shown in FIG. 4 Note the coordinates for point L in FIG. 4 may be different from those of point R in FIG. 3. The force sensor outputs at points D, E and G on sensors 17, 18, and 19, respectively can be related to the force vector applied at the finger by $$\begin{bmatrix} M_D \\ M_E \\ M_G \end{bmatrix} = \begin{bmatrix} (Z_L - Z_D) & 0 & -(X_L - X_D) \\ -(Y_L - Y_E) & (X_L - X_E) & 0 \\ (X_L - X_G) & 0 & -(X_L - X_G) \end{bmatrix} \begin{bmatrix} F_{LX} \\ F_{LY} \\ F_{LZ} \end{bmatrix} \qquad (5)$$

Figure 5:
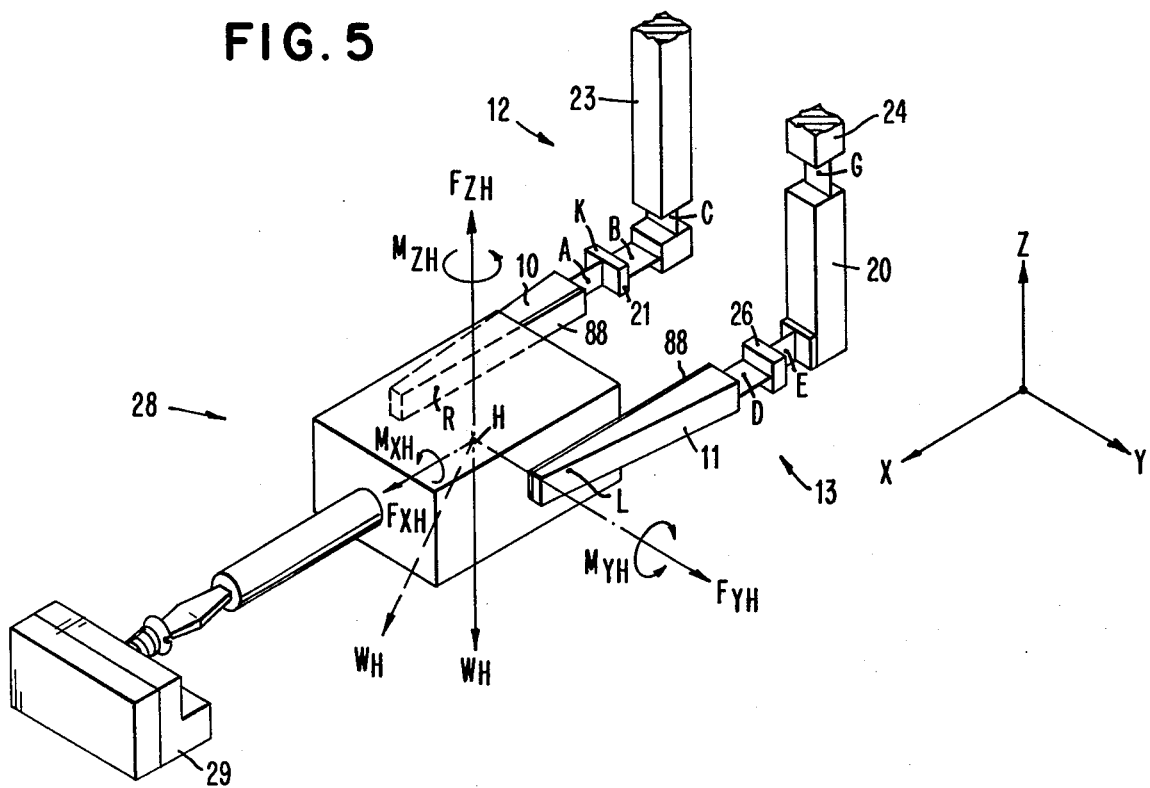
FIG. 5 shows the gripper fingers of FIG. 2 holding a power screw driver adjacent to a work table or fixture.

Referring to FIG. 5, a pair of parallel fingers 10, 11 are holding an object, e.g. a screw driver 28. The contact force between the screw driver 28 and a work table 29 can always be transferred to a force vector applied at the center of gravity (point H) of the object 28, being held by fingers 10, 11. The force vector consists of six components, $F_{XH}$, $F_{YH}$ and $F_{ZH}$ and three moments $M_{XH}$, $M_{YH}$ and $M_{ZH}$. Assume the contact point between the object (e.g. screw driver) and the right finger 10 is point R. The contact point between the object and the left finger 11 is point L. Taking the object as a free body, the force equilibrium equations for this object are $$F_{XH} = F_{XR} + F_{XL} \qquad (6A)$$

$$F_{YH} = F_{YR} + F_{YL} \qquad (6B)$$

$$F_{ZH} = F_{ZR} + F_{ZL} \qquad (6C)$$

$$M_{XH} = F_{ZR} \cdot (Y_R - Y_H) + F_{ZL} \cdot (Y_L - Y_H) + F_{YR} \cdot (Z_R - Z_H) - F_{YL} \cdot (Z_L - Z_H) \qquad (6D)$$

$$M_{YH} = (-F_{ZR}) \cdot (X_R - X_H) + (-F_{ZL}) \cdot (X_L - X_H) + (F_{XR}) \cdot (Z_R - Z_H) + (F_{XL}) \cdot (Z_L - Z_H) \qquad (6E)$$

$$M_{ZH} = (-F_{XR}) \cdot (Y_R - Y_H) \cdot (-F_{XL}) \cdot (Y_L - Y_H) + (F_{YR}) \cdot (X_R - X_H) \cdot (F_{YL}) \cdot (X_L - X_H) \qquad (6F)$$

In general, there is also a moment at the contact points between the finger and the object. If the gripping surface has been specially designed, e.g. a moment isolator surface 88 composed of an elastomer on the gripping surfaces of fingers 10 and 11, only a force can be translated to the finger. Eqs. (6A to 6F) can be written in the matrix form as $$\begin{bmatrix} F_{XH} \\ F_{YH} \\ F_{ZH} \\ M_{XH} \\ M_{YH} \\ M_{ZH} \end{bmatrix} = \begin{bmatrix} 1 & 0 & 0 & | & 1 & 0 & 0 \\ 0 & 1 & 0 & | & 0 & 1 & 0 \\ 0 & 0 & 1 & | & 0 & 0 & 1 \\ \hline 0 & (Z_R - Z_H)(Y_R - Y_H) & 0 & | & 0 & (Z_L - Z_H)(Y_L - Y_H) \\ (Z_L - Z_H) & 0 & (X_R - X_H) & | & (Z_R - Z_H) & 0 & -(X_L - X_H) \\ -(Y_R - Y_H)(X_R - X_H) & 0 & | & -(Y_L - Y_H)(X_L - X_H) & 0 \end{bmatrix} \cdot \begin{bmatrix} F_{XR} \\ F_{YR} \\ F_{ZR} \\ F_{XL} \\ F_{YL} \\ F_{ZL} \end{bmatrix}$$

OR $$\bar{F}_H = \widetilde{A} \cdot \bar{F}_{RL} \tag{7}$$

Eqs. (4) and (5) can be combined as $$\begin{bmatrix} \begin{bmatrix} F_{XR} \\ F_{YR} \\ F_{ZR} \end{bmatrix} \\ \begin{bmatrix} F_{XL} \\ F_{YL} \\ F_{ZL} \end{bmatrix} \end{bmatrix} = \begin{bmatrix} \begin{bmatrix} -(Y_R - Y_A)(X_R - X_A) & 0 \\ (Z_R - Z_B) & 0 & -(X_R - X_B) \\ (Z_R - Z_C) & 0 & -(X_R - X_C) \end{bmatrix}^{-1} & 0 \\ 0 & \begin{bmatrix} (Z_L - Z_D) & 0 & -(X_L - X_D) \\ -(Y_L - Y_E)(X_L - X_E) & 0 \\ (X_L - X_G) & 0 & (X_L - X_G) \end{bmatrix}^{-1} \end{bmatrix} \begin{bmatrix} M_A \\ M_B \\ M_C \\ M_D \\ M_E \\ M_G \end{bmatrix}$$

OR $$\bar{F}_{RL} = [\widetilde{B}] \cdot \bar{F}_m$$

combining eqs. (7) and (8), we obtain $$\bar{F}_H = [\widetilde{A}] \cdot \bar{F}_{RL} = [\widetilde{A}] \cdot [\widetilde{B}] \cdot \bar{F}_m = [\widetilde{H}] \cdot \bar{F}_m \tag{9}$$

Eq. (9) provides the general relation between the measurement vector, $\bar{F}_m$, (output of the six sensors) and the force vector applied at the object being held at the finger $\bar{F}_H$. If one has the measurement output from the six sensors, he can estimate the force vector applied to the finger but he cannot estimate the general force vector applied at the object being held by the finger. Equation (9) shows that the sensor output is a function of the following parameters:

(1) weight of the object being held by the finger (1 unknown)
(2) Parts position and orientation of the object (6 unknowns)
(3) Lengths between contact points of an object held by the fingers (1 unknown)
(4) Contact force and moment between the finger and the object (6 unknowns)
(5) Contact force and contact position between the object 28 being held by the fingers and a workpiece or work table 29 as shown in FIG. 5 (6 unknowns)

In other words, there are six measurement outputs from six sensors (A,B,C,D,E and G as shown in FIG. 5), but there are at least 20 possible unknowns. There are a series of computer algorithms and hardware devices described herein for extracting some of the more than 20 unknowns from a very limited number of sensors. (six sensors A,B,C,D,E and G as shown in FIG. 5). These techniques are described below item by item:

Item 1: Mechanical Location of the Sensor System

The conventional six-degree-of-freedom force sensor is located at the connecting point between the wrist system and arm system e.g. point U as shown in FIG. 1A. (See Scheinman V. D. Design of a Computer Controlled Manipulator, AIM 92, June 1969). The advantage of such a conventional system is that the sensor output is independent of the gripping force between the finger and object being held. The disadvantage of such an approach is a separate force sensor is required to measure the gripping force. The other disadvantage of the conventional system is that the sensor output is a function of the wrist motor positions. Sensors 12 and 13 are located at the inner ends of the fingers as shown in FIGS. 1A and 2. With software and hardware techniques, one can obtain all the unknown forces and moments applied at the object held by fingers 10 and 11.

Item 2: Relative Position Between the Fingers System and Wrist System

Figure 6:
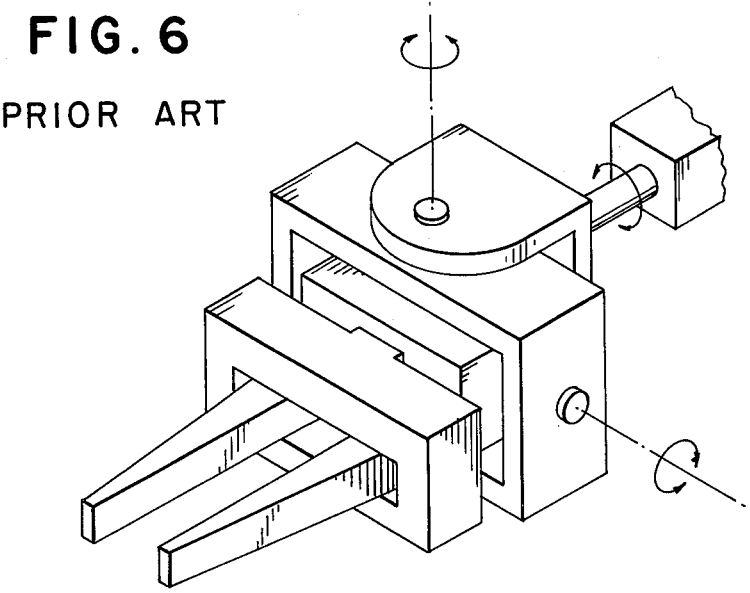
FIG. 6 shows a prior art manipulator gripper, with a conventional finger system.

The conventional finger system is shown in FIG. 6 (e.g. see Gill Aharon, Visual Feedback and Related Problems in Computer Controlled Hand Eye Coordination, Report No. STAN-CS-72-312, Stanford University, October 1972). The finger system of FIGS. 1A-5 will allow the manipulator system to pick up a long rod without moving the wrist system. The "L" shaped finger configuration can also be accomodated in design with the offset force sensor.

Item 3: Unsymmetric Finger System

If the force sensor of a right finger were identical to the sensor system of a left finger of a gripper, then the matrix [A] in equation (7) would be a singular matrix. With the asymmetric system of FIGS. 1A-5, the singularity of the matrix [A] is eliminated and six-degree-of-freedom force sensor information can be obtained.

Item 4: Search for an Object with One Finger

Figure 7:
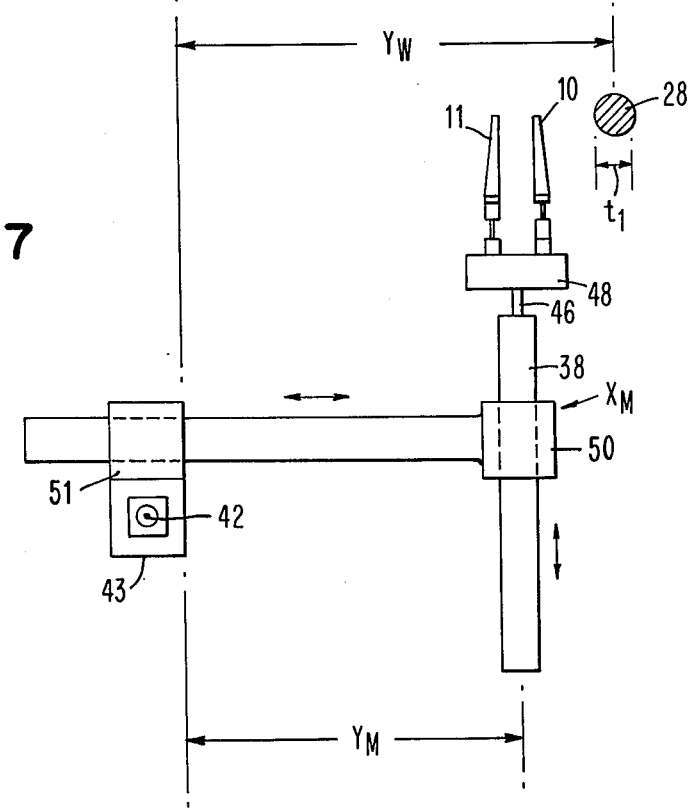
FIG. 7 shows a plan view of a portion of the manipulator of FIG. 1A and a power screw driver.

One application of the proposed sensor system as shown in FIG. 5 can be found in locating a post (e.g. a pen, a screw driver, etc.). Referring to FIG. 7, the orientation of the center line of a post in the form of a screw driver 28 must be known. For example, in FIG. 7, the center line of the screw driver 28 coincides with the Z axis. The chord length or diameter $t_1$ of the screw driver 28 is stored in the computer, the exact location of the screw driver is unknown. The flow chart for a computer program for automatically determining the location of the screw driver is shown in FIG. 8.

Figure 8:
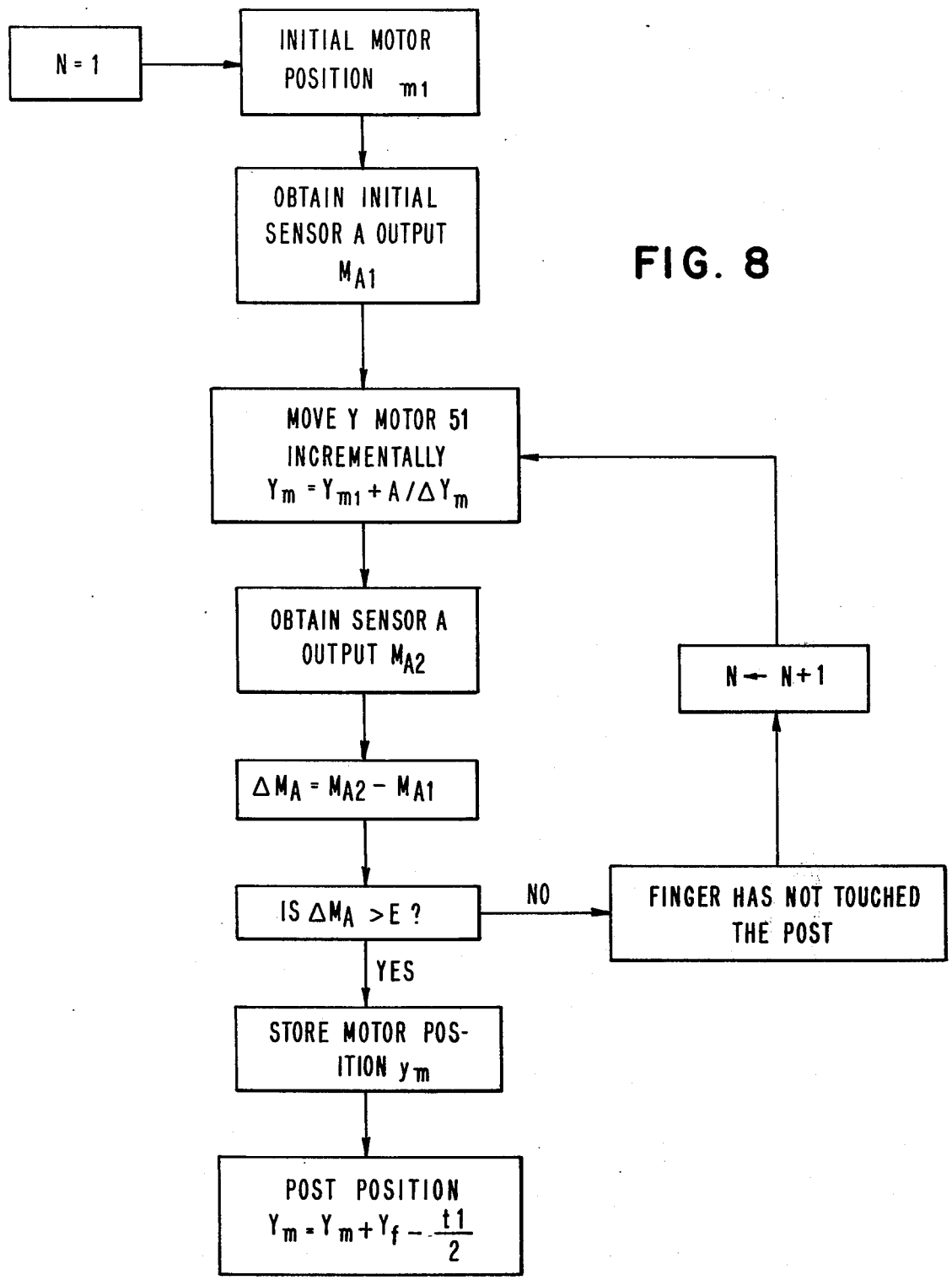
FIG. 8 shows a flow chart for moving the fingers in FIG. 7 until they touch the screw driver.

Referring to FIGS. 7 and 8, the Y motor 51 moves until the finger 10 touches the screw driver 28. At the instant when finger 10 touches screw driver 28, the force sensor output $\Delta M_A$ exceeds a prescribed value E, and the Y arm segment position at that instant is registered by potentiometer 116. The relative position between the finger surface and the Y arm segment is measured by the Y arm segment position sensing potentiometer 114 at point M in FIG. 7. The exact position of the screw driver can be computed by $$Y_{\overline{W}} = Y_M + Y_f - (t_1/2) \qquad (10)$$

Figure 9:
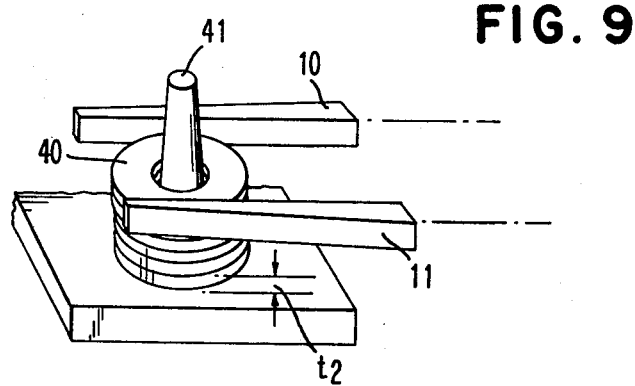
FIG. 9 shows a front elevation of the fingers of FIG. 1A oriented vertically above a post holding several washers.

In a similar manner, the manipulator system can locate a washer 40 on washer post 41 as shown in FIG. 9. In this case, the prior information is the thickness of the washer, $t_2$, and the direction of the center line of the washer post.

Item 5: Pick Up an Object with a Controlled Gripping Force

Figure 10:
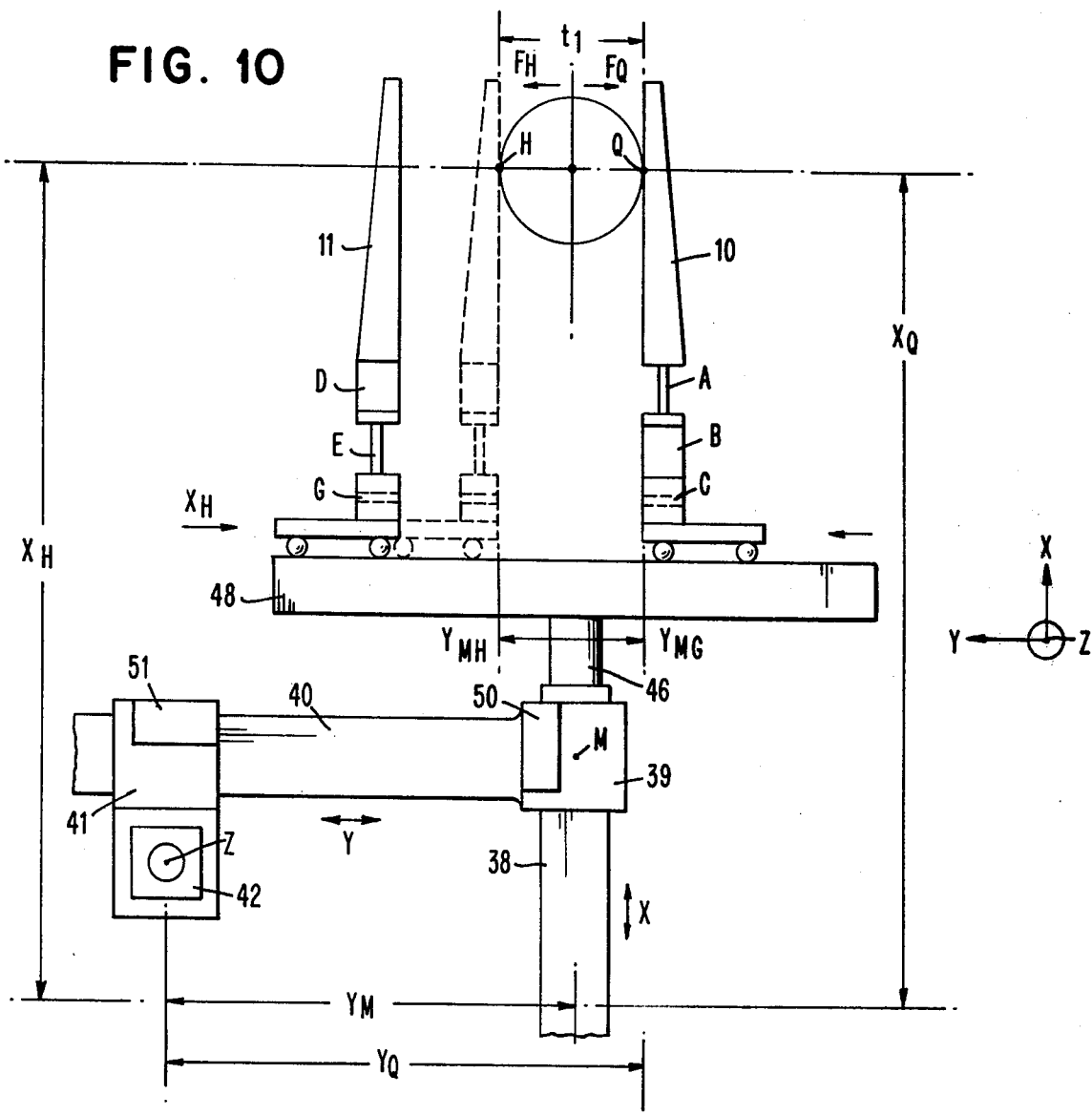
FIG. 10 shows a plan view a portion of the manipulator of FIG. 1A with the screw driver between the opened fingers.

Referring to FIG. 7, once the approximate position of the object 28 (e.g. a screw driver) has been determined, the manipulator system can move to a position as shown in FIG. 10. By simultaneously operating the Y motor 51 and the finger motors as shown by the flow chart in FIG. 11, the finger 10 contacts the screw driver e.g. point Q in FIG. 10. The Y coordinate of the contact point Q is $$Y_Q = Y_M + Y_{MQ} + d_Q \qquad (11)$$

where $Y_M$ and $Y_{MQ}$ are the positions of Y arm segment 40 and the finger motor system respectively and they can be measured by potentiometer 116 and 78 respectively. Value $d_Q$ is the deflection of the finger which will be described later. After the finger 10 contacts one side of the object 28 (screw driver), the motor 74 for the fingers 10 and 11 and the Y motor system are moved simultaneously (FIG. 11) until both the right and left fingers 10 and 11 contact the object 28 (e.g., screw driver) at points Q and H as shown in FIG. 10 with the position of left finger 11 shown in phantom. The Y coordinate of point H is $$Y_H = Y_M - Y_{MH} - d_H \qquad (12)$$

where $Y_{MH}$ is the left finger motor position $d_H$ is the finger deflection at point H. If the geometry of the object is simple, e.g. a screw driver 28 as shown in FIG. 10, the X coordinates of the contact points Q and H must be the same. (i.e. $X_Q = X_H$). The gripping force between the object 28 and the fingers 10 and 11 can be related to the sensor output as $$M_A = (-F_Q) \cdot (X_Q - X_A) \qquad (13)$$

$$M_E = (F_H) \cdot (X_H - X_E) = (F_Q) \cdot (X_H - X_E) = (-F_Q) \cdot (X_Q - X_E) \qquad (14)$$

The coordinates $X_A$ and $X_E$ of the sensor elements A and E have been measured previously. Therefore, the gripping force and the contact position between the finger and the object being held by the finger can be determined from eqs. (13) and (14) from $$(-F_Q) = \frac{M_E - M_A}{X_A - X_E} \qquad (15)$$

$$X_Q = X_A + \frac{(M_A)(X_A - X_E)}{(M_E - M_A)} \qquad (16)$$

Figure 11:
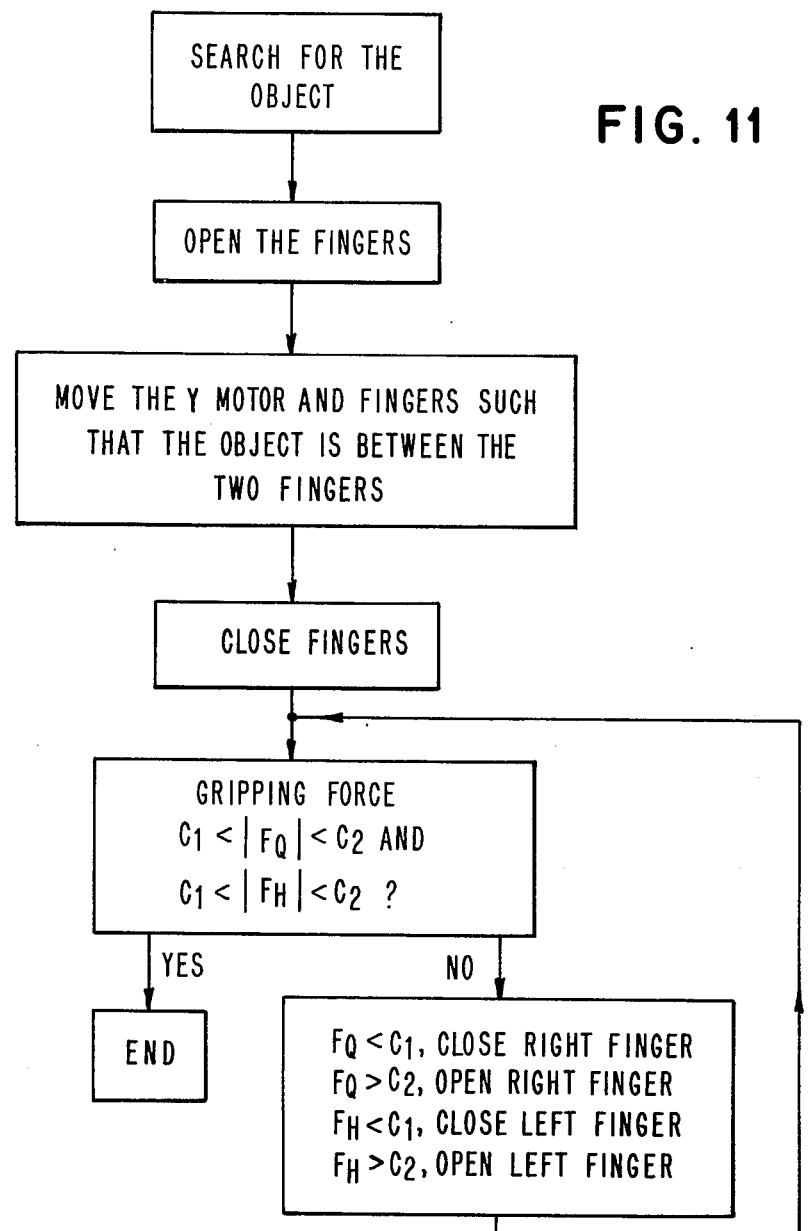
FIG. 11 shows the flow chart for operating the manipulator in the position of FIG. 10 to pick up the screw driver.

From eqs. 15 and 16, a controlled gripping force can be applied to the manipulator system to pick up an object. The flow chart is shown in FIG. 11. If the gripping force and the contact position are known, the deformation of the finger can be accurately determined from the structural beam equation and the screw driver diameter or chord length, $t_1$, can be accurately determined from eqs. 11 and 12. It should be noted that the sensor system consists of three orthogonal thin beams and the deformation of the fingers 10 and 11 can be accurately calculated. In contrast, prior art manipulator sensor systems normally have a complex configuration and the deformation of the finger is not easily measured and computed when performing manipulator assembly tasks.

Item 6: Weighing an Object

The force sensor system can be employed to measure the weight of an object. Referring to FIG. 5, at a specific position, where the Z coordinate coincides with the gravitation force, sensors B, C, D and G are all sensitive to the weight of the object being held by the fingers. Therefore, the weight of the object can be determined by $$W_H = \frac{M_C - M_B}{X_C - X_B} + \frac{M_G - M_D}{X_G - X_D} \qquad (17)$$

where $M_C$, $M_B$, $M_G$, and $M_D$ are the sensor output of sensors C,B,G and D respectively. Note the simplicity of eq. 17, as compared with using other sensors, in which case weighing an object may not be a simple task.

Item 7: Locating the Center of Gravity of an Object at the Manipulator's Hand

Once the weight of the object has been obtained the location of the center gravity of the object can also be determined. Referring to FIG. 5, at the specific position where the Z axis coordinate coincides with the gravitational force, the weight vector $W_H$ may be divided into two components, $W_{HR}$ and $W_{HL}$. $W_{HR}$ is the weight that will apply to the right finger 10 and $W_{HL}$ is the weight that will apply to the left finger 11. From the sensor output from sensors B and C 14 and 16, one can determine the value of $W_{HR}$ and the X coordinate of point H. From sensor outputs of sensors 17 and 19, D and G, one can compute the value of $W_{HL}$ and the X coordinate of point H. In other words, the X coordinate of the center gravity (point H) can be either determined from right finger sensors or left finger sensors. This provides criteria which are useful when checking the accuracy of the sensor system.

In a similar manner, one can move the finger systems such that the Y or Z coordinate coincides with the gravitation force to determine the Y and Z coordinates of the center of gravity of the object (e.g. point H in FIG. 5).

Item 8: Sensor Output Due to the Weight of the Object at any Orientation

During the assembly process, the manipulator system can be rotated to any orientation. Therefore, the sensor outputs due to the weight of the object will vary at different orientations. Following the procedure presented in steps 6 and 7, one can determine the weight and the center of gravity of the object being held by the manipulator fingers. Referring to FIG. 1A, the absolute orientation of the finger system can be computed from the output voltage of the potentiometers at the pitch, yaw and roll motors and the vector, $\overline{W}_H$, due to the weight of the object can be obtained. The sensor output can be computed from eq. (18)

$$\overline{F}_M = [\tilde{H}]^- \overline{W}_H$$

where $[\tilde{H}]$ is defined in eq. (9). $\overline{F}_M$ is a vector consisting of six sensor outputs (also defined in eq. (9)).

Figure 12:
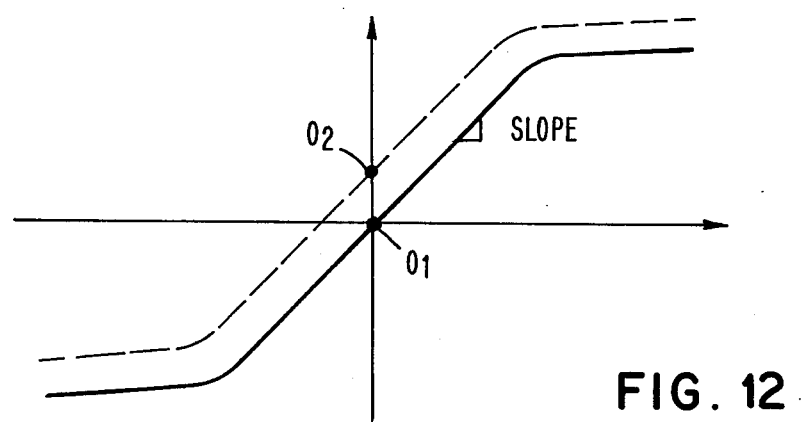
FIG. 12 shows a typical force-sensor output from one of the modules on the fingers as shown in FIG. 2.

Item 9: Selection of the Zero Reference Point for the Sensor Output and System Applications A typical force sensor output is shown in FIG. 12 (solid line). If the temperature has been changed, then the zero reference point will be shifted from point $0_1$ to point $0_2$. The zero reference point will also be shifted if the orientation of the finger system has been changed. Referring to FIG. 5, if the orientation of the finger system has been rotated, the force vector $\overline{W}_H$ due to the dead weight of the object being held by the finger will be shifted from the solid line $W_H$ to a dotted line $W_H$ in FIG. 5. The dead weight of the blocks between adjacent sensors, (e.g. block K between sensor A and B) will also change the absolute voltage output of the sensor system. Therefore, the sensor output must compensate for the weight effect presented in step 8. An alternate calibration technique which has been implemented in this manipulator system is based on the value of the slope as shown in FIG. 7. Then e.q. (9) can be modified as $$[\Delta \overline{F}_M] = [\Delta Q] \cdot [\Delta \overline{F}_H] \tag{13}$$

Where $[\Delta \overline{F}_H]$ is the incremetal force vector applied at the object being held by the finger and $[\Delta \overline{F}_M]$ is the incremental sensor output vector.

Once the $[\Delta Q]$ matrix has been obtained, it can be stored in the computer system and will be used to determine the contact force between the object (e.g. a screw in FIG. 5) and a work table. This technique is shown in FIG. 13.

With reference to FIGS. 3, 4 and 5 it is assumed that only forces (e.g. $F_{XR}$, $F_{YR}$, $F_{ZR}$, $F_{XL}$, $F_{YL}$ and $F_{ZL}$) will be applied to the finger. However, the same procedure will also be applied to the system where moments will also be applied to the finger. Additional equations must be set up to include the compliance of gripping surface.

Item 10:

In U.S. patent application Ser. No. 565,930 filed Apr. 7, 1975, now U.S. Pat. No. 4,001,556 by Folchi et al. for a "Computer Controlled Pneumatic Retractable Search Sensor", a technique has been developed to determine the approximate parts orientation. With a stiff pneumatic wand mounted on the finger, the force sensor measures the force applied at the wand system. Therefore, the sensor system can also be used in determining the parts orientation. This force sensor system will give the analog signal and measure the X, Y and Z component of the force applied at the wand. Thus, the wand system gives only the digital signal, i.e., the wand contacts or does not contact the foreign object.

In Conclusion

This sensor system and these data analysis techniques have been developed to measure a large number of parameters for the assembly process. Inclusion in these parameters are (1) gripping force, (2) a six-degree-of-freedom force vector applied at the object being held by the manipulator, (3) weight of the object, (4) center of gravity of the object, (5) approximate location and orientation of an object on a work table. Using this system, one can perform a complex typewriter subassembly task.

This sensor system interfaces with the computer system. Note special hardware controllers can be easily built to perform the assembly work which we have implemented by a software system. These programs cover almost all the important assembly tasks. These programs are a. determining the weight of an object held by the finger
b. picking up an object with a controlled force
c. searching for a post
d. locating an object with one finger
e. locating an object with two fingers
f. picking up an object from several objects mixed in a bin on a box
g. tightening up a screw by a manipulator system.

The system can give an analog signal to measure the X, Y and Z force applied at a wand system which is mounted at the finger not shown.

In the literature most of the force sensors are mounted between the wrist system and arm system to eliminate the coupling effect between the gripping force and the force vector applied at the object. The disadvantage of prior art systems is that the force sensor output is a function of the wrist and fingers position. The sensors used herein are mounted at the ends of the fingers. A new method has been developed to minimize the coupling effect between the gripping forces and the force vectors applied to the object being held by the fingers.

The force sensor output is a function of the following coupling parameters:

a. weight of the object being held by the fingers
b. parts position and orientation of the object
c. chord length of the object
d. gripping forces between the object and the finger
e. external forces applied to the object being held by the fingers.

Techniques have been developed to decouple these coupling effects. More than 20 unknown parameters can be estimated from the two sets of three degree of freedom force sensors.

SUMMARY OF THE PREFERRED EMBODIMENT

Referring to FIG. 1A, manipulator gripper 45 includes a set of multi-degree of freedom force sensors A, B, C, D, E, G for providing force and moment data to determine the position and orientation of an object in the fingers 11 and 12 of a manipulator system. It includes strain gauge assemblies rigidly connected at a first end to a finger and rigidly connected at a second end to a drive member 48 for the fingers. The strain gauge assemblies include a plurality of interconnected strain gauge modules. Each of the strain gauge modules is composed of a generally I-shaped beam having a thin central beam adapted for mounting strain gauges on its relatively wide, flat surfaces. End portions of the I-beam provide means for rigidly interconnecting the strain gauge modules with the I-beam generally oriented orthogonally or at a 90° twist and/or rotation from each other. The strain gauge modules are configured in block-like fashion to provide a strain gauge assembly with three degrees of freedom sensing for each finger, and at least one of the I-beam modules (module G) of the strain gauge assembly associated with one finger 11 is substantially offset in position with respect to the strain gauge assembly (module C) associated with finger 10 which cooperates with finger 11. The central beam of each module has a generally rectangular plate shape, such that each of the strain gauge modules is essentially sensitive to moments about the axis extending transversely across the central beam and through its center, and is sensitive to the forces that are perpendicular to the relatively wide, flat surfaces of the central beam. A pair of strain gauges is mounted adjacent each other on each wide, flat surface of each central beam, providing a total of four strain gauges. The four strain gauges are electrically connected in a Wheatstone bridge circuit with the opposite connected elements of the circuit being comprised of the pair of strain gauges on the same central beam surface. The strain gauge assemblies comprise one or more of the strain gauge modules for individually sensing forces in respective x, y and z directions and for sensing moments about the x, y and z axes, thereby providing six degrees of freedom sensing of forces. Such strain gauge modules are shown in U.S. Pat. No. 3,948,093 described above.

Linkage means 23 and 24 connect the fingers 10 and 11 to drive portion 48. Each finger has associated with it a plurality of force sensors A, B, C or D, E, G, with corresponding ones thereof having similar moment arms with the exception that one of the sensors (sensor G) on one of said fingers (11) is substantially offset with respect to the corresponding sensor on the other finger (10) to provide substantially different moment force components.

Referring to FIG. 2, fingers 10 and 11 have substantially parallel gripping surfaces. Finger 10 has secured thereto a first I-beam 14 having vertically extending sidewalls parallel to the axis of finger 10 connected at junction 21 to a second I-beam 15 having horizontally extending sidewalls. Second I-beam 15 is connected at its inboard end to an elbow block 22 connected to a third I-beam 16 extending in a vertical plane normal to that of first I-beam 14. Third I-beam 16 is connected at its inboard end to a leg 23 comprising a linkage means extending upwardly towards drive portion 48. The second finger 11 has a fourth I-beam sensor 17 secured thereto having a horizontal plane parallel to second I-beam 15. A fifth I-beam 18 is connected to the four I-beam 17 having a plane parallel to the first I-beam 14, and an elbow and linkage block 20 has a substantial vertical length at right angles to the axis of second finger 11. A sixth I-beam 19 is connected to the inboard end of elbow and linkage block 20 having a plane parallel to that of third I-beam 16. Sixth I-beam 19 is substantially offset in vertical position with respect to third I-beam 16 by being substantially farther away from its elbow, so a much different moment arm is involved.

What is claimed is:

1. A mechanical manipulator system including a gripper having a drive portion and at least a pair of opposed fingers for grasping objects, each of said fingers having a gripping portion with a gripping surface, linkage means for connecting said fingers to said drive portion, each of said fingers having associated therewith a plurality of force sensors, with corresponding ones thereof having similar moment arms and an asymmetric relationship of the orientation of analogous sensors for said pair of fingers with the exception that at least one of said sensors on one of said fingers is substantially offset in location with respect to the moment arm of a corresponding sensor on another finger to provide substantially different moment force components whereby when an object is grasped between said fingers, said system is capable of measuring a number of degrees of freedom equal to the sum of the numbers of sensors on said fingers.

2. A manipulator system in accordance with claim 1 including on each finger a set of multi-degree of freedom force sensors for providing force and moment data to determine the position and orientation of an object in the fingers of a manipulator system comprising, a strain gauge assembly rigidly connected at a first end to a said finger and rigidly connected at a second end to a drive member for a said finger, said strain gauge assembly including a plurality of interconnected strain gauge modules, each of said strain gauge modules comprising a generally I-shaped beam having a thin central beam adapted for mounting strain gauges on its relatively wide, flat surfaces, and end portions of said I-beam providing means for rigidly interconnecting said strain gauge modules with the I-beam generally oriented at a 90° twist and/or rotation from each other, wherein said strain gauge modules can be configured in blocklike fashion to provide a strain gauge assembly with the desired number of degrees of freedom sensing.

3. A manipulator system in accordance with claim 2 wherein said fingers have substantially parallel gripping surfaces, a first finger has secured thereto a first said I-beam having vertically extending sidewalls parallel to the axis of said finger connected to a second I-beam having horizontally extending sidewalls, said second I-beam connected at its inboard end to an elbow block connected to a third I-beam extending in a vertical plane normal to that of said first I-beam, said third I-beam being connected at its inboard end to a leg comprising a linkage means extending upwardly towards said drive portion, said second finger having a fourth I-beam sensor secured thereto having a horizontal plane parallel to said second I-beam, a fifth I-beam connected to said fourth I-beam having a plane parallel to said first I-beam, and an elbow and linkage block having a substantial length at right angles to said second finger, a sixth I-beam connected to the inboard end of said elbow and linkage block having a plane parallel to said third I-beam, said sixth I-beam being substantially offset with respect to said third I-beam by being substantially farther away from its elbow.

4. A mechanical manipulator system in accordance with claim 1 including means for combining moment values from the sensors to weigh an object held in said fingers.

5. A mechanical manipulator system in accordance with claim 1 including means for locating the center of gravity of an object.

6. A manipulator gripper including a pair of opposed fingers for grasping objects, each of said fingers having a set of multi-degree of freedom force sensors for providing force and moment data to determine the position and orientation of an object in the fingers of a manipulator system, comprising force sensor assemblies rigidly connected at a first end to a said finger and rigidly connected at a second end to a drive member for said fingers, each sensor having a preferred response axis, said force sensor assemblies including a plurality of interconnected sensors, portions of said sensors providing means for rigidly interconnecting said sensors with the sensors generally oriented at a 90° twist and/or rotation from each other, said sensors are configured in a fashion to provide an assembly of sensors with the desired number of degrees of freedom of sensing, at least one of the sensors of the assembly associated with one finger is substantially offset in position with respect to the sensors associated with another finger cooperating therewith, and an asymmetric relationship of the orientation of analogous sensors for said pair of fingers whereby when an object is grasped between said fingers, said system is capable of measuring a greater number of degrees of freedom than when said fingers operate alone.

7. A manipulator gripper including a pair of opposed fingers for grasping objects, each of said fingers having a set of multi-degree of freedom force sensors for providing force and moment data to determine the position and orientation of an object in the fingers of a manipulator system, comprising strain gauge assemblies rigidly connected at a first end to said finger and rigidly connected at a second end to a drive member for said fingers, said strain gauge assembles including a plurality of interconnected strain gauge modules, each of said strain gauge modules comprising a generally I-shaped beam having a thin central beam adapted for mounting strain gauges on its relatively wide, flat surfaces, and end portions of said I-beam providing means for rigidly interconnecting said strain gauge modules with the I-beam generally oriented at a 90° twist and/or rotation from each other, and an asymmetric relationship of the orientation of analogous strain gauge assemblies from said pair of fingers, whereby said strain gauge modules can be configured in block-like fashion to provide a strain gauge assembly with the desired number of degrees of freedom sensing, and an I-beam module of the strain gauge assembly associated with one finger is substantially offset in position with respect to the strain gauge assembly associated with another finger cooperating therewith whereby when said fingers cooperate to grasp an object therebetween, said system is capable of measuring a greater number of degrees of freedom than when said fingers operate alone.

8. A manipulator gripper including a set of sensors as recited in claim 7, wherein each said central beam has a general rectangular plate shape, such that each of said strain gauge modules is essentially sensitive to moments about the axis extending transversely across said central beam and through its center, and sensitive to the forces that are perpendicular to the relatively wide, flat surfaces of said central beam.

9. A manipulator gripper including a set of sensors as recited in claim 7, wherein a pair of strain gauges are mounted adjacent each other on each wide, flat surface of said central beam, providing a total of four strain gauges.

10. A manipulator gripper including a set of sensors as recited in claim 9, wherein said four strain gauges are electrically connected in a Wheatstone bridge circuit with the opposite connected elements of said circuit being comprised of the pair of strain gauges on the same central beam surface.

11. A manipulator gripper including a set of strain gauge assemblies as recited in claim 7, wherein said strain gauge assemblies comprise one or more of said strain gauge modules for individually sensing forces in respective x, y and z directions and for sensing moments about the x, y and z axes, thereby providing six degrees of freedom sensing of forces.

12. A manipulator gripper for grasping objects including a pair of fingers with a set of multi-degree of freedom force sensors for providing force and moment data to a system for forces applied via a control means, comprising a pair of fingers, each finger having a strain gauge assembly rigidly connected at a first end to said control means and rigidly connected at a second end to said finger, each of said strain gauge assemblies comprising a plurality of interconnected strain gauge modules with an asymmetric relationship of the orientation of analogous sensors for said pair of fingers, each of said strain gauge modules comprising a generally I-shaped beam having a central beam with the relatively wide, flat surfaces for mounting strain gauges thereon, and means on the ends of said central beam for interconnecting said I-beams in orthogonal relationship with the other beams to provide a strain gauge assembly with the desired number of degrees of freedom sensing, and one of said assemblies having at least one module substantially offset from the corresponding module for the other finger whereby when an object is grasped between said fingers, said system is capable of measuring a number of degrees of freedom equal to the sum of the numbers of sensors on said fingers.

13. A manipulator gripper including a set of sensors as recited in claim 12, wherein each of said strain gauge modules is interconnected in orthogonal relationship with the other modules so that each strain gauge module is sensitive only to the forces that are perpendicular to the relatively wide, flat surface of the central beam, and sensitive to the moments about the axis extending transversely across said beam and through its center.

* * * * *